United States Patent
Gonring et al.

(10) Patent No.: US 6,414,607 B1
(45) Date of Patent: Jul. 2, 2002

(54) THROTTLE POSITION SENSOR WITH IMPROVED REDUNDANCY AND HIGH RESOLUTION

(75) Inventors: Steven J. Gonring, Slinger; John R. Boatman, Fond du Lac, both of WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/427,995

(22) Filed: Oct. 27, 1999

(51) Int. Cl.[7] .............................................. H03M 11/00
(52) U.S. Cl. ...................... 341/20; 123/319; 123/361; 701/70; 701/21; 701/93; 74/482; 74/513
(58) Field of Search ........................... 341/20; 123/399, 123/361, 363, 376, 350, 319; 701/70, 21, 93; 74/471 XY, 479.01, 482, 513; 73/118.1

(56) References Cited

U.S. PATENT DOCUMENTS

| | | | |
|---|---|---|---|
| 5,321,980 A | 6/1994 | Hering et al. ................. | 73/118 |
| 5,438,516 A | 8/1995 | Neubauer et al. ............ | 364/426 |
| 5,445,126 A | 8/1995 | Grayes, Jr. ................... | 123/399 |
| 5,576,704 A * | 11/1996 | Baker et al. .................. | 200/6 A |
| 5,602,732 A | 2/1997 | Nichols et al. .............. | 364/424 |
| 5,625,558 A * | 4/1997 | Togai et al. ................. | 123/349 |
| 5,669,353 A | 9/1997 | Shirai et al. ................. | 123/399 |
| 5,831,554 A * | 11/1998 | Hedayat et al. ............. | 200/6 A |
| 5,880,684 A * | 3/1999 | Diekhans et al. ............. | 341/20 |
| 5,944,766 A * | 8/1999 | White ......................... | 180/179 |
| 6,023,227 A * | 2/2000 | Yanko et al. ................ | 180/272 |
| 6,282,482 B1 * | 8/2001 | Hedstrom .................... | 701/70 |

* cited by examiner

Primary Examiner—Michael Horabik
Assistant Examiner—Albert K. Wong
(74) Attorney, Agent, or Firm—William D. Lanyi

(57) ABSTRACT

A throttle position sensor is provided with a plurality of sensing elements which allow the throttle position sensor to provide a high resolution output to measure the physical position of a manually movable member, such as a throttle handle, more accurately than would otherwise be possible. The plurality of sensors significantly increases the redundancy of the sensor and allows its operation even if one of the sensing elements is disabled.

17 Claims, 3 Drawing Sheets

THROTTLE POSITION SENSOR WITH IMPROVED REDUNDANCY AND HIGH RESOLUTION

BACKGROUND OF THE INVENTION

1. Field of the Invention

The present invention is generally related to a throttle position sensor and, more particularly, to a throttle position sensor that comprises a plurality of individual sensing elements that are combined to improve the resolution of the sensor and to provide an additional level of redundancy in the event that one of the sensors fails during operation.

2. Description of the Prior Art

Sensors are used in many applications to determine the position of one object relative to another object. In certain applications, a potentiometer is used and the movement of one object relative to the other, changes the effective resistance of the potentiometer and a voltage potential between two points of the potentiometer can be used as an indicator of the relative positions of the two objects. Position sensors are used in many different applications.

U.S. Pat. No. 5,445,126, which issued to Graves, Jr. on Aug. 29, 1995, describes an accelerator pedal calibration and fault detection. The invention automatically calibrates an electronic accelerator pedal having an idle validation switch. Automatic calibration accommodates variation between vehicles so that error tolerances may be reduced. The system and method utilize the idle validation switch in combination with the accelerator pedal to provide redundancy by cross-checking signals received from each component. Automatic calibration is performed through the operation of the vehicle. An initial idle position and an initial full throttle setting are chosen to induce a vehicle operator to fully depress the accelerator pedal. The fully depressed pedal determines the new full throttle position. Thereafter, under proper conditions, a new full throttle position is set when a pedal sensor indicates the current position exceeds the current full throttle set point. The system and method also provide a fail-safe design which returns to idle fueling when certain fault conditions are detected.

U.S. Pat. No. 5,321,980, which issued to Hering et al on Jun. 21, 1994, describes an integrated throttle position sensor with independent position validation sensor. The sensor includes electrically independent throttle position and position validation components responsive to a single mechanical input applied to a protective sensor housing. By suitable mounting to the throttle control device, the mechanical input corresponds to accelerator pedal position. Within the sensor housing, a potentiometer moves with the mechanical input whereby a variable voltage throttle position signal is generated. Also, within the housing a separate validation switch responsive to the mechanical input provides an independent representation of throttle control device position in the form of, for example, a bi-state validation signal. The sensor integrates previous separate throttle control position and position validation functions into a single environmentally secure housing which requires no calibration. The integrated sensor is more reliable and less costly than previously available separate throttle control and idle validation functions.

U.S. Pat. No. 5,438,516, which issued to Neubauer et al on Aug. 1, 1995, describes an integrated vehicle brake control device position sensor with precalibrated multiple sensor outputs. This device is generally related to the invention of U.S. Pat. No. 5,321,980.

U.S. Pat. No. 5,602,732, which issued to Nichols et al on Feb. 11, 1997, describes a fault tolerant displacement determination method.

Resolution of redundant displacement sensor information to form a displacement value in an automotive electronic throttle control system provides for a varying contribution by each of a plurality of redundant sensors to the formation of the displacement value in accordance with diagnosed variations in the fault status of the sensors. The number and type of fault conditions attributed to a specific sensor of the plurality over an analysis period are used to determine the relative degree by which that sensor will contribute to the displacement value formation. As an increasing number of fault conditions are attributed to a sensor, the relative degree of contribution of that sensor will gradually decrease. When severe fault conditions are attributed to a sensor, the relative degree of contribution of that sensor will rapidly decrease.

U.S. Pat. No. 5,669,353, which issued to Shirai et al on Sep. 23, 1997, described a valve feedback control having redundant valve opening sensors. A throttle control system has two throttle opening sensors. When one sensor in a PID feedback loop becomes abnormal, as sensed by monitoring the difference between outputs of the dual sensors, the use of sensor output for throttle feedback control is switched from the abnormal to the other, normal one. Which one of the throttle opening sensors has become abnormal is determined by monitoring the intensity of electric current flowing to a DC motor which drives the throttle valve. Further, if an abnormality in the newly used other sensor is determined, feedback control is continued based on an estimation of throttle opening calculated by using output of the sensor before its malfunction.

When sensors are used to determined the precise position of a manually movable member, such as a throttle control handle, it would be beneficial if a means could be provided to improve the resolution of the position reading so that very small movements of the manually movable member can be accurately detected with output signals that are sufficiently distinct to indicate those small movements of the manually movable member. It would also be beneficial if improved redundancy could be provided so that the failure of a single sensor would not disable the total sensing system.

SUMMARY OF THE INVENTION

A throttle position sensor made in accordance with the present invention comprises a manually movable member, such as a throttle handle, that is movable between a first end of travel in a first direction of travel and a second end of travel in a second direction of travel. For example, the throttle handle can be movable between a maximum forward setting and a maximum reverse setting. The throttle position sensor of the present invention further comprises a first sensor having a first output signal that is representative of the distance between the manually movable member and a generally central position which is located between the first and second ends of travel of the manually movable member. In other words, the first output signal represents distance that the manually movable member has moved from the central position, whether that movement is in a direction toward the first or second ends of travel.

The throttle position sensor also comprises a second sensor having a second output signal that is representative of the distance between the manually movable member and the first end of travel. In comparison to the first output signal, the second output signal represents the distance from one of the ends of travel and not from the central position.

The throttle position sensor of the present invention further comprises a controller that is connected in signal communication with the first and second sensors to receive the first and second output signals. The controller is configured to determine the position of the manually movable member as a combined function of both the first and second output signals.

Some embodiments of the present invention can further comprise a third sensor having a third output signal that is representative of the distance between the manually movable member and the first end of travel. The controller is connected in signal communication with the first, second, and third sensors to s receive the first, second, and third output signals. The controller is configured to determine the position of the manually movable member as a combined function of the first, second, and third output signals. It should be understood that the second and third sensors provide a degree of redundancy and, as such, the second and third output signals provide essentially the same information. The second and third sensors also provide a degree of redundancy with respect to the first sensor because either the second or third output signal can be used in place of the first output signal if the first sensor fails.

The first, second, and third sensors can comprise an analog-to-digital converter that converts a voltage signal to a digital output.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
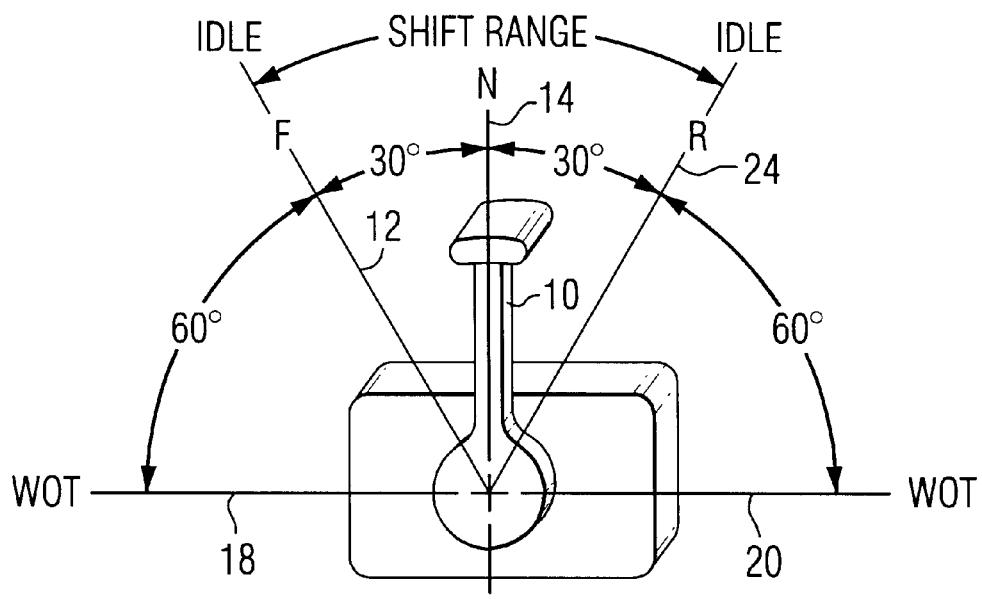
FIG. 1 shows a throttle assembly.

Throughout the description of the preferred embodiment, like components will be identified by like reference numerals.

It is not common for some steering and throttle systems to utilize electrical signals, rather than mechanical connections, to accomplish the steering and throttle control functions of a vehicle. Electrical sensors, electrical wires, and electrically controlled actuators now replace the more traditional throttle mechanisms and shift cables that had been used for these purposes. As a result, a sensor is required to determine the position of a throttle control handle and provide signals to a micro-processor that allow the microprocessor to respond to the position of the throttle handle. In certain applications, a known type of potentiometer could perform this sensing duty. However, typical potentiometers that are available for these purposes do not provide the desired resolution nor the redundancy needed for applications related to marine propulsion systems. Typical potentiometers provide a linear output range from ground potential to the supply voltage, which is typically 5 volts, as they are rotated through their mechanical range. For example, a 180° potentiometer with 5 volts applied to its inputs will vary linearly from approximately 0.5 volts to approximately 4.5 volts as the potentiometer is rotated from 0° to 180°. If this potentiometer were used as a throttle position sensor, it would provide a 4 volt range between its extreme ends of travel with approximately 0.5 volts in the wide open throttle reverse position and approximately 4.5 volts in the wide open throttle forward position. If an 8-bit-analog-to-digital (A/D) converter is used in the controller to interpret the information from the potentiometer, this voltage range could be divided into 256 calibratable points. In other words, using an 8-bit A/D converter, a typical potentiometer could identify 256 different throttle positions that are distinguishable from each other.

The present invention provides a throttle position sensor that incorporates a plurality of potentiometers. One of the potentiometers can provide at least twice the resolution of a conventional configuration without increased analog-to-digital resolution being required. The other two potentiometers resolve the ambiguity in the first potentiometer, provide additional redundancy, and can be used for gear selection in applications utilizing a single power lever.

The primary sensor would comprise a single 8-bit a/d converter combined with a potentiometer that is a combination of two potentiometer segments, or sensing elements, connected to a manually movable member, or throttle handle, that increases the voltage output from the primary potentiometer structure from its highest voltage output at one extreme end of travel of the throttle handle, to its lowest voltage output near a central portion of the throttle handles range of travel and again provide the highest voltage signal at the opposite end of travel. In certain applications, a dead band in the primary sensor can be provided to prevent a change in voltage output from occurring between certain positions proximate the central position of the total range of travel of the manually movable member.

FIG. 1 illustrates a manually movable member 10 which is a throttle control handle of a marine vessel. The total mechanical range of travel of the handle 10 extends from wide open throttle (WOT) in the forward direction 18 to wide open throttle (WOT) in the reverse direction 20. The total travel, in the example of FIG. 1, comprises 180° of movement of the throttle handle 10. In FIG. 1, the throttle handle 10 is shown at its generally central position, which is a neutral position for a marine vessel, but it can travel to a first end of travel 18 in the forward direction and can also travel to a second end of travel 20 in a reverse direction. It should also be noted that the range of travel within 30° of the generally central position 14 is designated as a shift range in FIG. 1. Within this range, a marine propulsion device operates in neutral and at sufficiently low speed to allow it to be shifted from forward gear to reverse gear. As the shift handle 10 is rotated from the position shown in FIG. 1 in a counterclockwise direction, the engine speed would continually be increased and the transmission would be shifted into forward gear between the neutral or generally central position 14 and a position, designated by line 12, that is approximately 30° from the generally central position 14 in a counterclockwise direction. As the throttle handle 10 is rotated back toward the neutral position 14 from a wide open throttle (WOT) position 18 in a clockwise direction, the transmission is shifted from forward gear to neutral within the range of travel between lines 12 and 14. Similarly, as the throttle handle is rotated from its neutral position 14 toward the wide open throttle (WOT) position 20 in a reverse direction, by moving the handle 10 in a clockwise direction, the transmission is shifted from neutral to reverse gear within the range of travel between the neutral position 14 and line 24.

With continued reference to FIG. 1, any sensing system that is used to determine the precise position of the handle 10 and convey that information to a micro-processor must exhibit several characteristics. First, it would be highly advantageous if the signals from the throttle position sensor to the controller are able to distinguish relatively small changes in movement of the handle 10. This characteristic is referred to as resolution, with a high resolution being significantly advantageous. Another characteristic that is advantageous in a throttle position sensor is a degree of redundancy that allows the system to operate even though one or more components is disabled.

Figure 2:
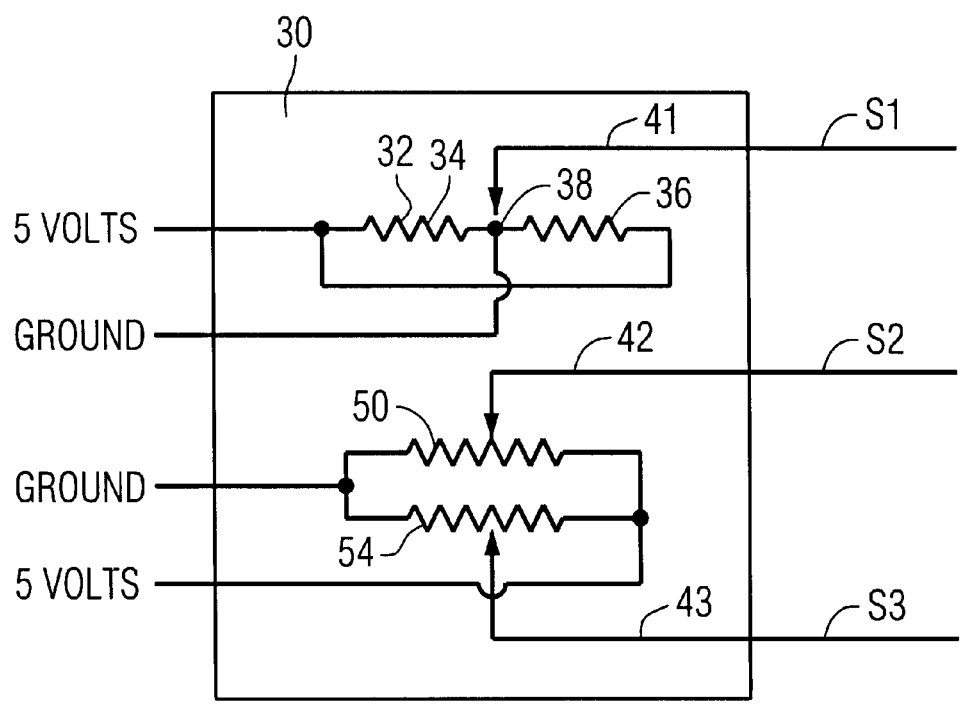
FIG. 2 is a simplified schematic representation of a throttle position sensor made in accordance with the present invention.

FIG. 2 is a simplified schematic representation of the throttle position sensor of the present invention. It comprises a first sensor 32 that, in turn, comprises two sensing elements, 34 and 36. A ground reference is connected to a central position 38 and the end positions are connected to a 5 volt potential as shown. A wiper 41 is mechanically connected to the throttle handle 10 to move back and forth, from left to right, in FIG. 2 in response to movement of the throttle handle 10 in a clockwise or counterclockwise direction from its neutral position 14. When in the neutral position 14, the throttle handle 10 causes the first wiper 41 to be in the position shown in FIG. 2. It can be seen that movement of the wiper 41 from an extreme leftward position in FIG. 2 to an extreme rightward position in FIG. 2 will cause the first output signal S1 to vary from 5 volts, to 0 volts at the central position 38, and back to 5 volts.

With continued reference to FIG. 2, the throttle position sensor 30 also is provided with a second sensor 50 that is also associated with a second wiper 42 that is attached to the throttle handle 10. As the second wiper 42 moves from the extreme left position to the extreme right position, the second output signal S2 will vary from 0 volts to 5 volts. In certain embodiments of the present invention, a third sensor 54 is also provided. The third sensor is configured in a manner that is generally equal to the way in which the second sensor 50 is configured. Both the second and third sensors, 50 and 54, provide output signals that vary from 0 volts to 5 volts as the second and third wipers, 42 and 43, move from the extreme left position to the extreme right position. These movements provide the second and third output signals, S2 and S3, that also vary from 0 to 5 volts. It should be understood that all 3 wipers, 41, 42, and 43, are connected together and attached for coordinated movement in response to movement of the throttle handle 10. It should also be understood that, although the three sensors, 32, 50, and 54, are illustrated as being straight components, certain embodiments of the present invention would incorporate potentiometers that are curved to respond to the rotational movement of the manually movable member, or throttle handle 10.

Figure 3:
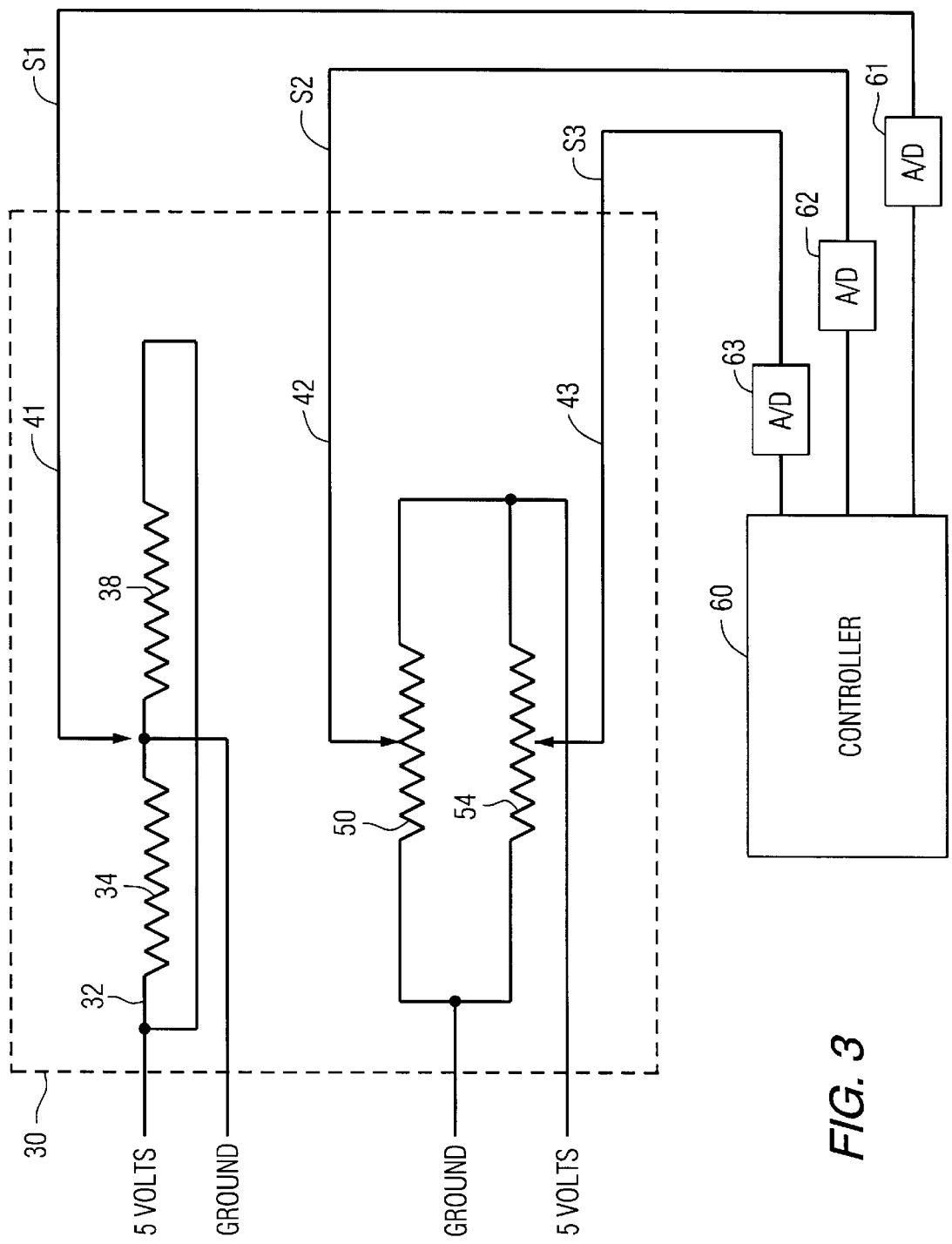
FIG. 3 shows the throttle position sensor of FIG. 2 connected to a plurality of analog-2-digital converters and a controller.

FIG. 3 shows the throttle position sensor 30 of the present invention connected in signal communication with the controller 60. Each of the signal lines for the first, second, and third output signals, S1–S3, is provided with an analog-to-digital (A/D) converter. These three A/D converters are identified by reference numerals 61–63. As the three wipers, 41–43, move back and forth from left to right in response to movement of the throttle handle 10, the analog voltage signal for each of the output signals, S1–S3, will vary in the manner described above in conjunction with FIG. 2 and as will be described in greater detail below in conjunction with FIG. 4. These analog voltage signals are provided as inputs to the respective A/D converters, 61–63, and the digital output signals from the A/D converters are provided as inputs to the controller 60.

Figure 4:
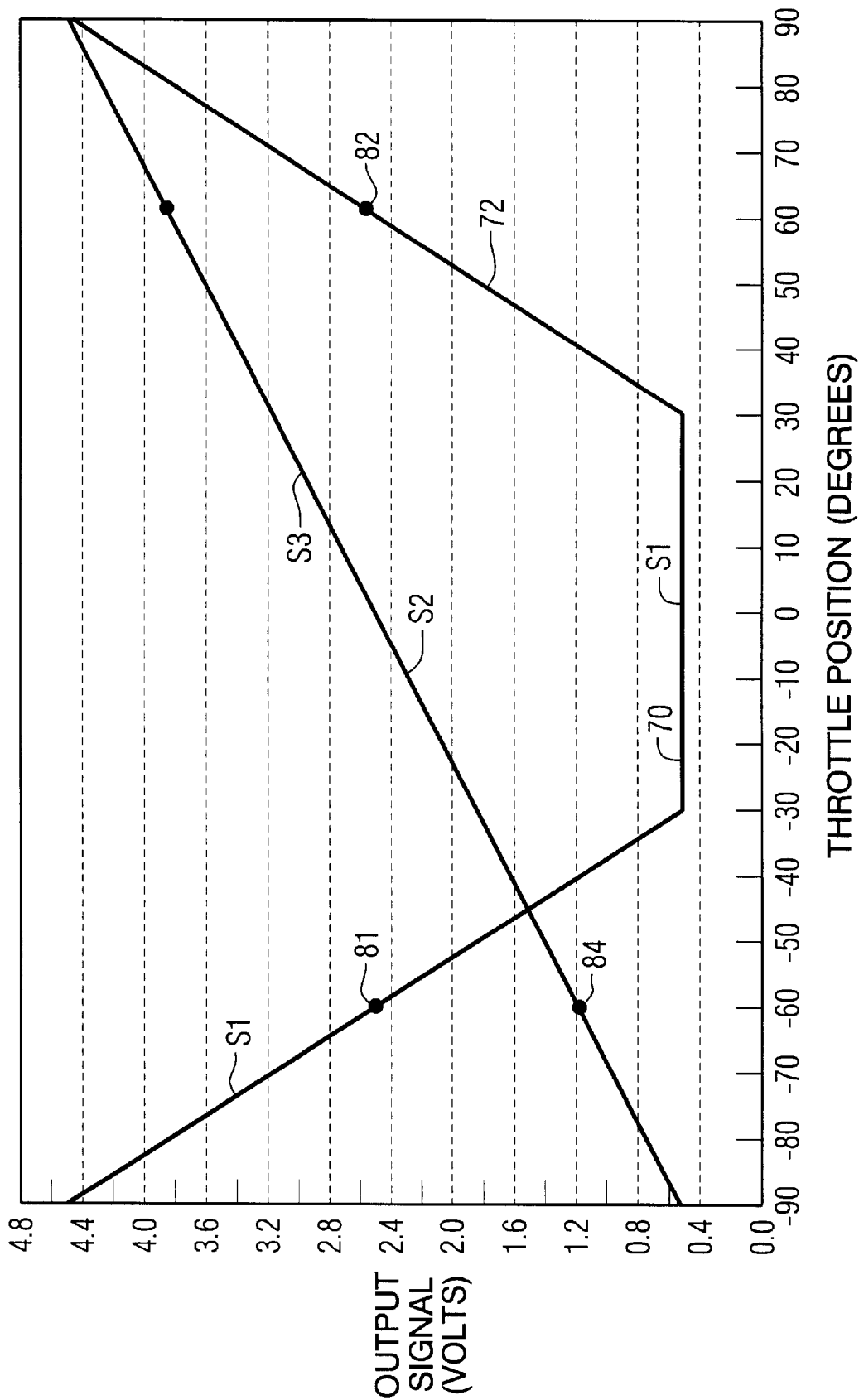
FIG. 4 is a graphical representation of the output signals provided by the present invention.

FIG. 4 is a graphical representation of the output signals from the first, second, and third sensor elements which are identified by reference numerals 32, 50, and 54 in FIGS. 2 and 3. As such, FIG. 4 also represents the magnitude of the output signals, S1–S3, as a function of the angular position of the throttle handle 10. For purposes of this description, it would be assumed that all three output signals, S1–S3, will be physically constrained to vary from approximately 0.5 volts to approximately 4.5 volts as their respective ranges between their minimum and maximum possible magnitudes. The first output signal S1 varies from 0.5 volts at −90° (e.g. wide open throttle in the forward direction) to approximately 4.5 volts at −30°. The dead band region identified by reference numeral 70 in FIG. 4 represents a portion of the first sensor 32 which does not result in a change of voltage as the wiper 41 moves through the generally central region. This can be accomplished by a conductive pad that replaces a portion of the resistive trace of the potentiometer. It should also be understood that this dead band 70 is not a requirement in all embodiments of the present invention.

With continued reference to FIG. 4, it can be seen that the voltage magnitude of the first output signal S1 changes from 0.5 volts to 4.5 volts in respond to a movement of the throttle handle from the −90° to the −30° position. If an 8-bit A/D 61 is connected to wiper 41, as shown in FIG. 3, each incremental change in the output from the A/D 61 will represent a position change of 0.234°. This is much more desirable than if a single potentiometer element was used to represent the entire range of the wiper between −90° and 0° and connected to the same A/D converter. In that case, the resolution would only be approximately 0.352° per incremental output from the A/D converter 61.

The configuration of the first sensor 32, as shown in FIG. 3, provides an increasing signal portion 72 as the throttle handle moves from the 30° position to the 90° position in the reverse direction. This variation in the output signal from the first sensor 32 covers the same range as the decreasing signal as the throttle handle moved from the −90° position to the −30° position. Therefore, in order to distinguish the forward position signals of the throttle handle 10 from the reverse position signals, more information is required. For this purpose, the second sensor 50 is provided and it produces a second output signal S2. With reference to FIGS. 2, 3, and 4, it can be seen that the second output signal S2 varies from 0.5 volts at −90° position to 4.5 volts at the +90° position. The second A/D converter 62 can then provide an output signal to the controller 60 that differentiates the location of the throttle handle 10 with 0.703° being represented by each incremental change in the output from the second A/D converter 62. This resolution of signal S2 is much less that the higher resolution of signal S1, but it is sufficient to allow the controller 60 to distinguish the forward positions from the reverse positions of the handle. For example, if the first output signal S1 from the first A/D converter 61 is equal to 128, and no other information is available, the controller 60 would not know if the throttle position was at −60° as represented by point 81 or at +600 as represented by point 82 in FIG. 4. However, if the second output S2 is less than 128, as represented by point 84, the controller 60 can distinguish between the two possible meanings, 81 and 82, and determine that the signal represents a position of −60°, as indicated by point 81, and not a position of 60°, as indicated by point 82. Therefore, the combination of the first and second output signals S1 and S2, provide an accurate indication of the position of the throttle handle 10 and also provide the increased resolution that is made possible by the configuration of the first sensor 32 that provides the first output signal S1.

With continued reference to FIG. 4, it can be seen that if the first sensor 32 is disabled and no first output signal S1 is available to the controller 60, the second output S2 could be used to identify the position of the throttle handle 10 although its resolution is less than the first output signal S1. However, the lower resolution of the second output signal S2 is fully sufficient to allow the marine vessel to be operated and to allow it to return to shore if the fault with the first sensor 32 occurs with the marine vessel being at a location distant from shore and from port.

A third output signal S3 is provided by the third sensor 54. The third output signal S3 is identical to the second output signal S2. Therefore, the second and third sensors, 50 and 54 provide redundancy for each other. As described above, each of the second and third sensors, 50 and 54, provide redundancy for the first sensor 32. As a result of the configuration provided by the throttle position sensor 30 of the present invention, the sensor system can survive the complete disablement of any one of the three sensing elements, 32, 50 and 54. In addition, as long as either the second sensor 50 or third sensor 54 is undamaged and working properly, the throttle position sensor 30 can operate in a manner that is sufficient to allow the operator of the marine vessel to return to port and have the disabled components repaired.

With reference to FIGS. 1, 2, 3, and 4, it can be seen that the present invention provides a throttle position sensor which comprises a manually movable member 10 that is movable between a first end of travel 18 in a first direction of travel and a second direction of travel 20 in a second direction of travel. A first sensor 32 has a first output signal S1 that is representative of the distance between the manually movable member 10, as represented by wiper 41, and a generally central position 14 between the first and second ends of travel, 18 and 20, of the manually movable member 10. A second sensor 50 has a second output signal S2 that is representative of the distance between the manually movable member 10, as represented by wiper 42, and the first end of travel 18. A controller 60 is connected in signal communication with the first and second sensors, 32 and 50 to receive the first and second output signals, S1 and S2. The controller 60 is configured to determine the position of the manually movable member 10 as a combined function of both the first and second output signals, S1 and S2. In other words, the first output signal S1 is used to determine, with a high degree of resolution, the magnitude of the angular position of the throttle handle 10 and the second output signal S2 is used to determine whether or not that angular position is positive or negative (i.e. in the reverse or positive directions).

The present invention also comprises a third sensor 54 that has a third output signal S1 that is representative of the distance between the manually movable member 10, as represented by wiper 43, and the first end of travel 18. The controller 60 is connected in signal communication with the first 32, second 50, and third 54 sensors to receive the first S1, second S2, and third S3 output signals. The controller 60 is configured to determine the position of the manually movable member 10 as a combined function of the first, second, and third output signals. As described above in conjunction with FIG. 3, the first, second, and third sensors each comprise an analog-to-digital converter that has a full scale output (i.e. 256 for an 8-bit A/D converter) that is equivalent to a movement of the manually movable member 10. With respect to the first sensor, the full scale output from the A/D converter represents a travel that is generally equal to the distance between the generally central position 14 and the first end of travel 18. This full scale output from the analog-2-digital converter 61 also represents the distance between the generally central position 14 and the second end of travel 20. The second and third sensors, 50 and 54, each comprise an A/D converter that has a full scale output that is generally equal to the distance between the first and second ends of travel, 18 and 20. Certain embodiments of the present invention incorporate a dead band 70 that is proximate to the generally central point 38 of the first sensor 32. The dead band 70 is provided between the first and second sensing elements, 34 and 36, as described above in conjunction with FIG. 2. It should be understood, however, that the dead band 70 is not a requirement in all embodiments of the present invention. Instead, the two sloping portions of the first output signal S1 could intersect each other at a voltage output magnitude of approximately 4.5 volts. This intersection will eliminate the dead band region 70, but would decrease the resolution slightly compared to the arrangement graphically represented in FIG. 4.

Although the present invention has been described in considerable detail and illustrated with particular specificity to explain a preferred embodiment, it should be understood that alternative embodiments, including non-linear or opposite response potentiometers, are also within its scope.

We claim:

1. A throttle position sensor, comprising:
   a manually moveable member for selecting a desired output of an engine that is moveable between a first end of travel in a first direction of travel and a second end of travel in a second direction of travel;
   a first sensor having a first output signal that is representative of the distance between said manually moveable member and a generally central position between said first and second ends of travel of said manually moveable member;
   a second sensor having a second output signal that is representative of the distance between said manually movable member and said first end of travel; and
   a controller connected in signal communication with said first and second sensors to receive said first and second output signals, said controller being configured to determine the position of said manually movable member as a combined function of both said first and second output signals.

2. The throttle position sensor of claim 1, further comprising:
   a third sensor having a third output signal that is representative of the distance between said manually movable member and said first end of travel, said controller being connected in signal communication with said first, second, and third sensors to receive said first, second, and third output signals, said controller being configured to determine the position of said manually movable member as a combined function of said first, second, and third output signals.

3. The throttle position sensor of claim 1, wherein:
   said first sensor comprises a first analog-to-digital converter having a full scale output that is representative of a movement of said manually movable member between said generally central position and said first end of travel.

4. The throttle position sensor of claim 1, wherein:
   said second sensor comprises a second analog-to-digital converter having a full scale output that is representative of a movement of said manually movable member between said first and second ends of travel.

5. The throttle position sensor of claim 2, wherein:
   said third sensor comprises a third analog-to-digital converter having a full scale output that is representative of a movement of said manually movable member between said first and second ends of travel.

6. The throttle position sensor of claim 1, wherein:

said first output signal is generally constant for a preselected range of positions of said manually movable member proximate said generally central position.

7. The throttle position sensor of claim 6, wherein:

said first output signal is generally constant and generally equal to its full scale output for said preselected range of positions of said manually movable member proximate said generally central position.

8. A throttle position sensor, comprising:

a manually moveable member for selecting a desired output of an engine that is moveable between a first end of travel in a first direction of travel and a second end of travel in a second direction of travel;

a first sensor having a first output signal that is representative of the distance between said manually moveable member and a generally central position between said first and second ends of travel of said manually moveable member;

a second sensor having a second output signal that is representative of the distance between said manually movable member and said first end of travel;

a third sensor having a third output signal that is representative of the distance between said manually movable member and said first end of travel; and a controller connected in signal communication with said first, second, and third sensors to receive said first, second, and third output signals, said controller being configured to determine the position of said manually moveable member as a combined function of said first output signal in conjunction with a preselected one of said second and third output signals.

9. The throttle position sensor of claim 8, wherein:

said first sensor comprises a first analog-to-digital converter having a full scale output that is representative of a movement of said manually movable member between said generally central position and said first end of travel.

10. The throttle position sensor of claim 9, wherein:

said second sensor comprises a second analog-to-digital converter having a full scale output that is representative of a movement of said manually movable member between said first and second ends of travel.

11. The throttle position sensor of claim 10, wherein:

said third sensor comprises a third analog-to-digital converter having a full scale output that is representative of a movement of said manually movable member between said first and second ends of travel.

12. The throttle position sensor of claim 11, wherein:

said first output signal is generally constant for a preselected range of positions of said manually movable member proximate said generally central position.

13. The throttle position sensor of claim 12, wherein:

said first output signal is generally constant and generally equal to its full scale output for said preselected range of positions of said manually movable member proximate said generally central position.

14. A throttle position sensor, comprising:

a manually moveable member for selecting a desired output of an engine that is moveable between a first end of travel in a first direction of travel and a second end of travel in a second direction of travel;

a first sensor having a first output signal that is representative of the distance between said manually moveable member and a generally central position between said first and second ends of travel of said manually moveable member, said first output signal being generally constant and generally equal to its full scale output for said preselected range of positions of said manually moveable member proximate said generally central position, a second sensor having a second output signal that is representative of the distance between said manually movable member and said first end of travel;

a third sensor having a third output signal that is representative of the distance between said manually movable member and said first end of travel; and a controller connected in signal communication with said first, second, and third sensors to receive said first, second, and third output signals, said controller being configured to determine the position of said manually moveable member as a combined function of said first output signal in conjunction with a preselected one of said second and third output signals.

15. The throttle position sensor of claim 14, wherein:

said first sensor comprises a first analog-to-digital converter having a full scale output that is representative of a movement of said manually movable member between said generally central position and said first end of travel.

16. The throttle position sensor of claim 15, wherein:

said second sensor comprises a second analog-to-digital converter having a full scale output that is representative of a movement of said manually movable member between said first and second ends of travel.

17. The throttle position sensor of claim 16, wherein:

said third sensor comprises a third analog-to-digital converter having a full scale output that is representative of a movement of said manually movable member between said first and second ends of travel, said first output signal being generally constant for a preselected range of positions of said manually movable member proximate said generally central position.

* * * * *